United States Patent
Deng et al.

(10) Patent No.: US 10,291,057 B2
(45) Date of Patent: May 14, 2019

(54) HEAD-WEARABLE DISPLAYING AND POWERING SYSTEM

(71) Applicant: Beijing Pico Technology Co., Ltd., Beijing (CN)

(72) Inventors: Xuebing Deng, Beijing (CN); Qiang Li, Beijing (CN); Xiangjun Ge, Beijing (CN); Yucai Han, Beijing (CN); Yuluo Wen, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 232 days.

(21) Appl. No.: 15/273,025

(22) Filed: Sep. 22, 2016

(65) Prior Publication Data
US 2018/0034304 A1    Feb. 1, 2018

(30) Foreign Application Priority Data
Jul. 29, 2016    (CN) .......................... 2016 1 0617515

(51) Int. Cl.
*H02J 50/90* (2016.01)
*H02J 7/02* (2016.01)
(Continued)

(52) U.S. Cl.
CPC .............. *H02J 7/025* (2013.01); *H02J 7/04* (2013.01); *H02J 50/90* (2016.02); *H02J 2007/0096* (2013.01)

(58) Field of Classification Search
USPC ...................................................... 307/104
See application file for complete search history.

(56) References Cited

U.S. PATENT DOCUMENTS

| | | | | |
|---|---|---|---|---|
| 2014/0132206 A1* | 5/2014 | Zhu | ......................... | H02J 50/12 320/108 |
| 2017/0364144 A1* | 12/2017 | Petrov | ..................... | G06F 3/012 |
| 2018/0059419 A1 | 3/2018 | Li et al. | | |

FOREIGN PATENT DOCUMENTS

| | | | |
|---|---|---|---|
| CN | 203434666 | * | 2/2014 |
| CN | 104917016 A | | 9/2015 |

(Continued)

*Primary Examiner* — Rexford N Barnie
*Assistant Examiner* — Xuan Ly
(74) *Attorney, Agent, or Firm* — Harness, Dickey & Pierce, P.L.C.

(57) ABSTRACT

The present disclosure discloses a head-wearable displaying and powering system, comprising a head-wearable display device, a portable terminal and a powering device; the powering device comprises a first communication interface for connecting to the portable terminal and a second communication interface for connecting to the head-wearable display device; a data pathway is disposed between two communication interfaces to implement direct communication between the head-wearable display device and the portable terminal; when the powering device is simultaneously connected with the portable terminal and head-wearable display device, the powering device powers the head-wearable display device, and the head-wearable display device does not consume electrical power of a battery of the portable terminal. Meanwhile, the head-wearable display device is directly connected to the portable terminal. When the powering device is only connected with the portable terminal, the powering device powers the portable terminal.

10 Claims, 3 Drawing Sheets

(51) Int. Cl.
*H02J 7/04* (2006.01)
*H02J 7/00* (2006.01)

(56) References Cited

FOREIGN PATENT DOCUMENTS

| | | |
|---|---|---|
| CN | 204928266 U | 12/2015 |
| CN | 105429247 A | 3/2016 |
| CN | 105554392 A | 5/2016 |
| CN | 205960698 U | 2/2017 |

\* cited by examiner

HEAD-WEARABLE DISPLAYING AND POWERING SYSTEM

CROSS-REFERENCE TO RELATED APPLICATION

This application claims the benefit and priority of Chinese Patent Application No. 201610617515.5 filed Jul. 29, 2016. The entire disclosure of the above application is incorporated herein by reference.

FIELD

The present disclosure relates to the technical field of virtual reality, and specifically to a head-wearable displaying and powering system.

BACKGROUND

This section provides background information related to the present disclosure which is not necessarily prior art.

As virtual reality technology develops, there are more and more types of virtual reality devices. A head-wearable display device used in operation with a portable terminal such as a mobile phone may provide a better user experience. The portable terminal, as a host machine, is connected to the head wearable display device via a cable. Since the portable terminal is responsible for data processing and the screen of the head-wearable display device is responsible for image display, the portable terminal, as compared with a current large-sized host machine, has a better portability and may allow the user to perform virtual reality experience whenever and wherever possible.

This type of head-wearable display device is usually powered in the following manners:

The first manner is using a battery of the portable terminal to power the head-wearable display device. However, in order to meet needs of design and portability, a capacity of a battery built in the current portable terminal usually is not large enough to make the battery power the head-wearable device in a long time period.

The second manner is powering the head-wearable display device by an external power supply. However, this method needs to provide an extra power supply interface or a power supply line on the head-wearable display device so that the product looks not pleasant enough. The method further increases the costs and affects portability in user's experience.

The third manner is providing a large-capacity battery in the head-wearable display device, and using electrical power stored in the battery to power the head-wearable display device. However, placement of the battery in the head-wearable display device is apt to cause the device to generate heat, the user's experience is undesirable, and superheat of the device or undesirable battery quality might threaten the user's personal security.

SUMMARY

This section provides a general summary of the disclosure, and is not a comprehensive disclosure of its full scope or all of its features.

The present disclosure provides a head-wearable displaying and powering system so that the head-wearable display device, without need to provide an extra power supply interface or power line, may obtain working power supply from a powering device in the head-wearable displaying and powering system, the head-wearable display device does not consume electrical power of a battery of a portable terminal, and a duration in which the head-wearable display device is used in cooperation with the portable terminal may be prolonged.

The present disclosure provides a head-wearable displaying and powering system, comprising a head-wearable display device, a portable terminal and a powering device;

The powering device comprises a first communication interface and a second communication interface, the first communication interface is used to connect the portable terminal, and the second communication interface is used to connect the head-wearable display device;

a data pathway is disposed between the first communication interface and the second communication interface, and data communication is directly performed between the head-wearable display device and the portable terminal via the data pathway;

when the powering device is simultaneously connected with the portable terminal and head-wearable display device, the powering device powers the head-wearable display device via the second communication interface;

when the powering device is only connected with the portable terminal, the powering device powers the portable terminal via the first communication interface.

Advantageous effects of the present disclosure are as follows: the head-wearable displaying and powering system according to the present disclosure comprises a head-wearable display device, a portable terminal and a powering device. The powering device is connected with the portable terminal via the first communication interface, and connected with the head-wearable display device via the second communication interface. When the powering device is connected with the portable terminal and the head-wearable display device simultaneously, the powering device powers the head-wearable display device, and the head-wearable display device does not consume electrical power of a battery of the portable terminal, and a duration in which the head-wearable display device is used in cooperation with the portable terminal is prolonged. The data pathway disposed between the first communication interface and second communication interface may implement direct communication between the portable terminal and the head-wearable display device. When powering device is connected with the portable terminal and the head-wearable display device simultaneously, the powering device does not affect cooperative use of the head-wearable display device and the portable terminal. Upon performing data communication, the head-wearable display device is connected to the powering device and which is equivalent to simultaneously connected to the portable terminal, so the head-wearable display device does not require arrangement of an extra power supply interface or power line. When the powering device is only connected with the portable terminal, the powering device powers the portable terminal and may prolong continued use duration of the portable terminal itself.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

A design idea of the present disclosure is as follows: connecting a powering device between a head-wearable display device and a portable terminal, using the powering device to power the head-wearable display device, the head-wearable display device does not consume electrical power of a battery of the portable terminal, and a duration in which the head-wearable display device is used in cooperation with the portable terminal is prolonged. A data pathway is provided in the interior of the powering device to achieve direct communication between the portable terminal and the head-wearable display device so that the powering device does not affect cooperative use of the head-wearable display device and portable terminal. Upon data communication, the head-wearable display device is connected to the powering device, also simultaneously connected the portable terminal, and the head-wearable display device does not require arrangement of an extra power supply interface or power line.

Figure 1:
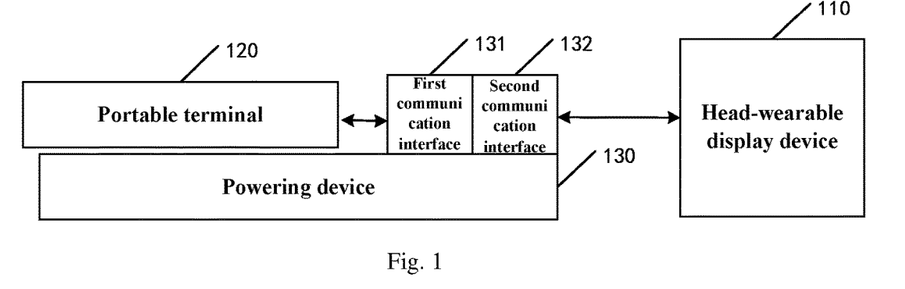
FIG. 1 is a block diagram of a head-wearable displaying and powering system according to an embodiment of the present disclosure.

FIG. 1 is a block diagram of a head-wearable displaying and powering system according to an embodiment of the present disclosure. As shown in FIG. 1, the head-wearable displaying and powering system according to the present embodiment comprises a head-wearable display device 110, a portable terminal 120 and a powering device 130.

The powering device 130 is provided with a first communication interface 131 and a second communication interface 132, the first communication interface 131 is used to connect the portable terminal 120, and the second communication interface 132 is used to connect the head-wearable display device 100.

A data pathway is disposed between the first communication interface 131 and the second communication interface 132, and the portable terminal 120 may directly perform data communication with the head-wearable display device 110 via the data pathway.

When the powering device 130 is simultaneously connected with the portable terminal 120 and head-wearable display device 110, the powering device 130 powers the head-wearable display device 110 via the second communication interface 132, whereupon the head-wearable device 110 does not consume electrical power of a battery of the portable terminal 120, and a duration in which the head-wearable display device is used in cooperation with the portable terminal is prolonged. The head-wearable display device 110, via the data pathway between the first communication interface 131 and the second communication interface 132, acquires audio and video signal from the portable terminal 120 and exchanges control data with the portable terminal 120. In this procedure, the head-wearable display device 110 is directly connected to 120, and the powering device 130 does not affect the cooperative use of the head-wearable display device 110 and the portable terminal. The head-wearable display device 110 only needs to be provided with one communication interface or cable connected to the second communication interface 132 on the powering device 130 to simultaneously implement connection to the portable terminal 120. The head-wearable display device 110 needn't be provided with an extra power supply interface or power line.

When the powering device 130 is only connected with the portable terminal 120, the powering device 130 may power the portable terminal 120 via the first communication interface and prolong continued use duration of the portable terminal 120.

Certainly, the powering device 130 may connect with the head-wearable display device via the second communication interface only. At this time, the head-wearable display device might not operate normally, but if the head-wearable display device 110 is provided with a power supply management chip and a built-in battery, the powering device 130 may charge the built-in battery of the head-wearable display device 110 so that power supply may be implemented initiatively when the head-wearable display device 110 is not directly connected with the portable terminal 120 via the powering device 130.

Figure 2:
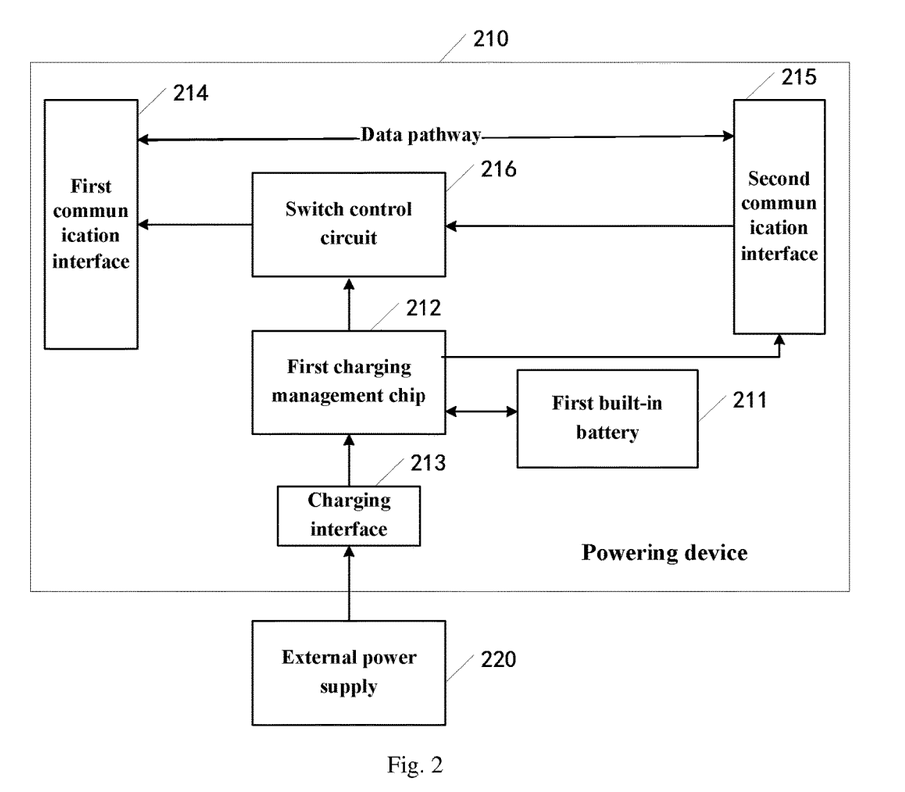
FIG. 2 is block diagram of a powering device in the head-wearable displaying and powering system according to an embodiment of the present disclosure.

FIG. 2 is block diagram of a powering device in a head-wearable displaying and powering system according to an embodiment of the present disclosure. As shown in FIG. 2, a powering device 210 comprises a housing consisting of an upper housing and a lower housing, a PCB and a first built-in battery 211 are disposed in the housings, the PCB is provided with a first charging management chip 212 and a charging interface 213, and the charging interface 213 is exposed out of the housings to connect with an external power supply 220. A first communication interface 214 and a second communication interface 215 are both disposed on the PCB and respectively connected with the first charging management chip 212 and exposed out of the housings.

When the charging interface 213 is not connected with the external power supply 220, the first charging management chip 212 takes power from the first built-in battery 211 to power the portable terminal connected to the first communication interface 214 or the head-wearable display device connected to the second communication interface 215.

When the charging interface 213 is connected with the external power supply 220, the first charging management chip 212 directly takes power from the external power supply 220 to power the portable terminal connected to the first communication interface 214 or the head-wearable display device connected to the second communication interface 215, and meanwhile charge the first built-in battery 211.

Preferably, the first communication interface 214 and second communication interface 215 are both a USB Type-C interface, the portable terminal connected to the first communication interface 214 is a smart mobile phone or tablet computer having a USB Type-C interface, and the head-wearable display device connected to the second communication interface 215 is also provided with a USB Type-C interface.

The USB Type-C interface standard is one type of USB 3.1 standard, possesses four pairs of differential signals, enables full duplex communication and supports 5V/20 A at most. USB Type-C may convert some or all differential signal channels therein to Displayport signal channels. If there are still remaining differential signals, they may be used for USB data transmission. Both the first communication interface 214 and second communication interface 215 employ the USB Type-C interface and may supply power to the portable terminal or head-wearable display device with a larger current, and the USB Type-C interface may further transmit a Displayport audio and video signal and USB data signal simultaneously so that the head-wearable display device may, via only one cable and one USB Type-C interface, acquire the audio and video signal in Displayport format from the portable terminal, exchange the data signal in USB format with the portable terminal, and acquire working power supply from the powering device.

Figure 3:
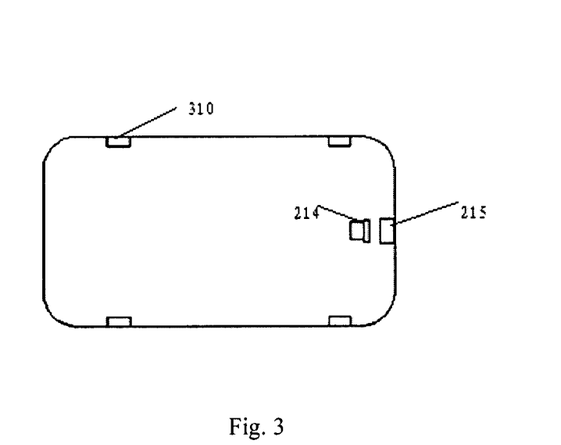
FIG. 3 is a view showing appearance of the powering device in the head-wearable displaying and powering system according to an embodiment of the present disclosure.

FIG. 3 is a view showing appearance of the powering device in the head-wearable displaying and powering system according to an embodiment of the present disclosure. Preferably, as shown in FIG. 3, the powering device is a battery back clip which is shaped to match the portable terminal, i.e., the powering device of the present disclosure serves as a protective casing of the portable terminal and an external battery. A peripheral edge of the upper housing of the powering device is provided with fixing structures 310 which may be a plurality of snap-fitting structures disposed separately on the peripheral edge of the upper casing, or one or more snap-on nesting structures disposed on one or more sides of the upper housing, or a combination of snap-fitting structures and snap-on nesting structures. The fixing structures 130 may fix the powering device to a back side of the portable terminal so that the powering device is portable.

Specifically, the first communication interface 214 is a USB Type-C male plug, and is disposed on an upper surface of the upper housing of the powering device. When the powering device is fixed on the back side of the portable terminal, the first communication interface may be inserted into a USB Type-C female receptacle disposed on the portable terminal.

Specifically, the second communication interface 115 is a USB Type-C female receptacle and disposed on an end face of the housing of the powering device. The USB Type-C male plug disposed on an external device and having a cable may be inserted in the female receptacle to implement connection with the powering device.

In addition, the charging interface 213 is a Micro USB interface and disposed on a side of the housing of the powering device to charge the first built-in battery 211 of the powering device. When the charging interface 213 is not connected to the external power supply 220, the powering device uses electrical power provided by the first built-in battery 211 to power the portable terminal or head-wearable display device. When the charging interface 213 is connected to the external source 220, the powering device uses electrical power provided by the external source 220 to directly power the portable terminal or head-wearable display device, and meanwhile charge the first built-in battery 211.

Preferably, a PCB of the powering device is further provided with a switch control circuit 216. The switch control circuit 216 is used to detect whether the head-wearable display device is connected to the second communication interface 215.

When the head-wearable display device is detected as having been connected to the second communication interface 215, the switch control circuit 216 controls a circuit between the first communication interface 214 and the first charging management chip 212 to turn off, the powering device powers the head-wearable display device via the second communication interface, the head-wearable display device does not consume electrical power of a battery of the portable terminal, and a duration in which the head-wearable display device is used in cooperation with the portable terminal may be prolonged.

When the head-wearable display device is detected as not being connected to the second communication interface 215, the switch control circuit 216 controls the circuit between the first communication interface 214 and the first charging management chip 212 to turn on, and the powering device powers the portable terminal via the first communication interface 214 to prolong continued use duration of the portable terminal itself.

Figure 4:
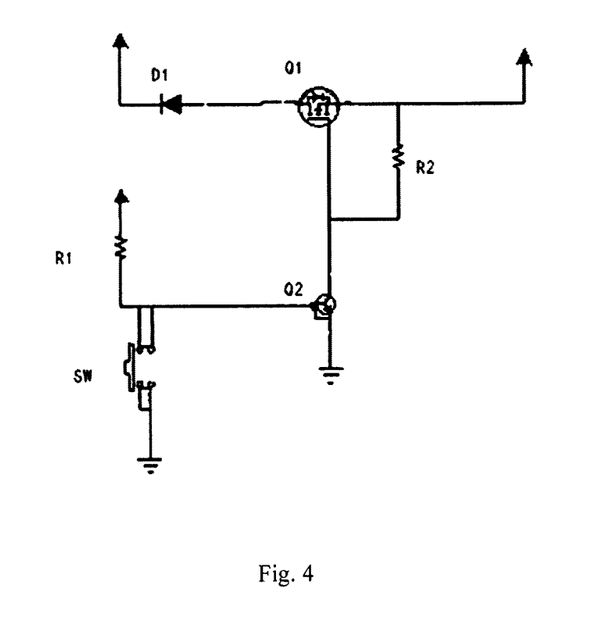
FIG. 4 is a circuit diagram of a switch control circuit of the powering device in the head-wearable displaying and powering system according to an embodiment of the present disclosure.

FIG. 4 is a circuit diagram of a switch control circuit of the powering device in the head-wearable displaying and powering system according to an embodiment of the present disclosure. As shown in FIG. 4, the switch control circuit in the preferred embodiment comprises a PMOS transistor Q1, a triode Q2, a pushbutton switch SW, a first resistor R1 and a second resistor R2.

A first terminal of the pushbutton switch SW is connected with a base of the triode Q2 and connected with a power supply output of the first charging management chip via the first resistor R1, and a second terminal of the pushbutton switch SW is grounded. A collector of the triode Q2 is connected with a gate of the PMOS transistor Q1, and an emitter of the triode Q2 is grounded. A source of the PMOS transistor Q1 is connected with a power supply output of the first charging management chip, and a drain is connected with the first communication interface.

Both terminals of the second resistor R2 are connected with the source and gate of the PMOS transistor Q1 respectively. The second transistor R2 is a clamping resistor, controls a voltage between the gate and source of the PMOS transistor and ensures a states of the PMOS transistor Q1.

When the head-wearable display device is connected to the second communication interface, the pushbutton switch SW is in an ON state, the base of the triode Q2 is grounded and the triode Q2 turns off, so the PMOS transistor Q1 also turns off, and the circuit between the first communication interface and the first charging management chip turns off.

When the head-wearable display device is not connected with the second communication interface, the pushbutton switch SW is in an OFF state, the base of the triode Q2 is connected with the power supply output of the power supply management chip via the first resistor R1 and is at a high voltage, the triode Q2 is turned on, the gate of the PMOS transistor Q1 is grounded, so the PMOS transistor Q1 is also turned on, and the circuit between the first communication interface and the first charging management chip is turned on.

Preferably, the switch control circuit further comprises a diode D1 whose positive electrode is connected to the drain of the PMOS transistor Q1 and whose negative electrode is connected with the first communication interface. When the powering device is connected with the portable terminal, power supply flowback of the portable terminal and damages to the powering device are prevented.

Figure 5:
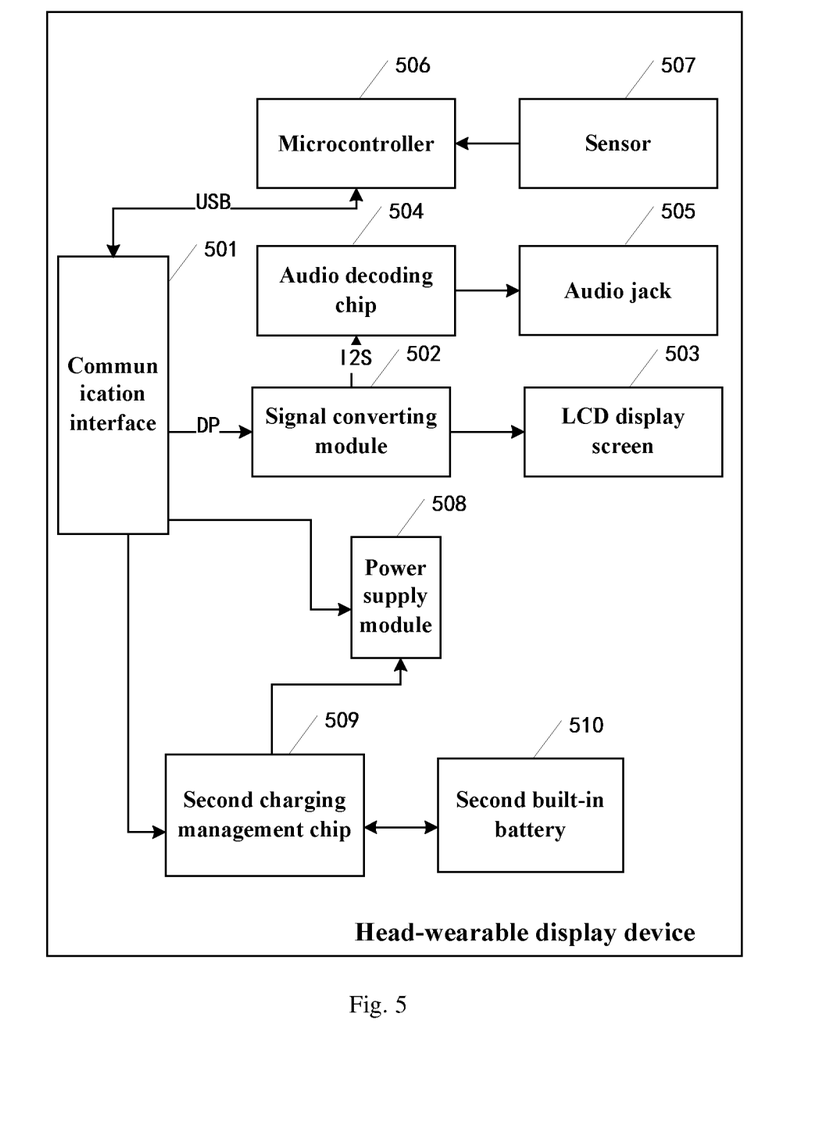
FIG. 5 is a block diagram of a head-wearable display device in the head-wearable displaying and powering system according to an embodiment of the present disclosure.

FIG. 5 is a block diagram of a head-wearable display device in the head-wearable displaying and powering system according to an embodiment of the present disclosure. As shown in FIG. 5, the head-wearable display device is connected with the second communication interface of the powering device via a USB Type-C communication interface 501, and receives Displayport type audio and video data transmitted from the portable terminal via a data pathway between the first communication interface and the second communication interface. A signal converting module 502 converts the Displayport type audio and video data into a video signal and an audio signal adapted for an LCD display screen 503 and an audio jack 505 (an audio decoding chip 504 is needed to decode the audio signal). A microcontroller 506 is responsible for exchanging control data with the portable terminal via the data pathway between the first communication interface and the second communication interface, including data collected by a sensor 507.

Preferably, the head-wearable display device is further provided with a power supply module 508. When the head-wearable display device is connected to the second communication interface of the powering device, the power supply module 508 obtains working power supply from the powering device and powers the head-wearable display device respective modules of the head-wearable display device.

Further preferably, in the head-wearable display device is provided a second charging management chip 509 and a second built-in battery 510. The second charging management chip 509 is connected with the communication interface 501, the second built-in battery 510 and the power supply module 508 respectively.

When the head-wearable display device is connected with the second communication interface of the powering device via the communication interface 501, the second charging management chip 509 takes power from the powering device to charge the second built-in battery 510.

When the head-wearable display device is not connected with the second communication interface of the powering device via the communication interface 501, the second charging management chip 509 takes power from the second built-in battery 510 to power the power supply module 508 so that the head-wearable display device has a self-powering capability and may prolong, to a certain degree, the duration in which the head-wearable display device is used in cooperation with the portable terminal. The powering system according to the present disclosure mainly uses the powering device to power the head-wearable display device. Usually, the second built-in battery 510 has a smaller capacity and is mainly intended to prevent accidental disconnection between the head-wearable display device and the powering device and prevent device malfunction that might be caused by sudden power failure of the head-wearable display device. Therefore, the second built-in battery 510 does not cause the problem that overheat of the device affects the user's experience.

To conclude, the head-wearable displaying and powering system according to the present disclosure comprises a head-wearable display device, a portable terminal and a powering device. The powering device is connected with the portable terminal via the first communication interface, and connected with the head-wearable display device via the second communication interface. When the powering device is connected with the portable terminal and the head-wearable display device simultaneously, the powering device powers the head-wearable display device, and the head-wearable display device does not consume electrical power of a battery of a portable terminal, and a duration in which the head-wearable display device is used in cooperation with the portable terminal is prolonged. The data pathway disposed between the first communication interface and second communication interface may implement direct communication between the portable terminal and the head-wearable display device. When powering device is connected with the portable terminal and the head-wearable display device simultaneously, the powering device does not affect cooperative use of the head-wearable display device and the portable terminal. Upon performing data communication, the head-wearable display device is connected to the powering device and which is equivalent to simultaneously connected to the portable terminal, so the head-wearable display device does not require arrangement of an extra power supply interface or power line. When the powering device is only connected with the portable terminal, the powering device powers the portable terminal and may prolong continued use duration of the portable terminal itself.

Secondly, both communication interfaces of the powering device employ a USB Type-C interface, may power the portable terminal or power the head-wearable display device with a larger current, and the USB Type-C interface may transmit the Displayport data and USB data simultaneously so that the head-wearable display device may, via only one cable and one USB Type-C interface, acquire the audio and video signal in Displayport format from the portable terminal, exchange the data signal in USB format with the portable terminal, and acquire working power supply from the powering device.

Finally, the powering device is a battery back clip which is shaped to match the portable terminal, and the powering device may be fixed to the back side of the portable terminal through fixing structures disposed on edges of the upper housing of the powering device, thereby enhancing overall portability of the head-wearable displaying and powering system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A head-wearable displaying and powering system comprising a head-wearable display device, a portable device and a powering device connected between the head-wearable display device and the portable device;

wherein the powering device comprises a first USB Type-C communication interface and a second USB Type-C communication interface, the first USB Type-C communication interface is configured to connect the powering device to the portable device, and the second USB Type-C communication interface is configured to connect the powering device to the head-wearable display device;

wherein a data pathway is disposed between the first USB Type-C communication interface and the second USB Type-C communication interface, and the data pathway is configured to provide data communication directly between the head-wearable display device and the portable device;

wherein when the powering device is simultaneously connected with the portable device and the head-wearable display device, the powering device is configured to power the head-wearable display device via the second USB Type-C communication interface; and wherein when the powering device is only connected with the portable device, the powering device is configured to power the portable device via the first USB Type-C communication interface.

2. The head-wearable displaying and powering system according to claim 1, wherein the powering device comprises a housing including an upper housing, a lower housing, a PCB and a first built-in battery, the PCB and the first built-in battery are disposed in the housings, the PCB includes a first charging management chip and a charging interface, and the charging interface is exposed out of the housings to connect with an external power supply;

wherein the first USB Type-C communication interface and the second USB Type-C communication interface are disposed on the PCB, connected with the first charging management chip and exposed out of the housings;

wherein when the charging interface is not connected with the external power supply, the first charging management chip is configured to receive power from the first built-in battery to power the portable device or the head-wearable display device; and wherein when the charging interface is connected with the external power supply, the first charging management chip is configured to receive power directly from the external power supply to power the portable device or the head-wearable display device, and charges the first built-in battery.

3. The head-wearable displaying and powering system according to claim 1, wherein the portable device is a smart mobile phone or tablet computer having a USB Type-C interface, and the head-wearable display device includes a USB Type-C interface.

4. The head-wearable displaying and powering system according to claim 1, wherein the powering device includes a battery back clip shaped to match the portable device; and wherein the power device includes two lateral edges with a fixing structure configured to fix the powering device to a backside of the portable device.

5. The head-wearable displaying and powering system according to claim 2, wherein:

the portable device is provided with a USB Type-C female receptacle, and the head-wearable display device is provided with a cabled USB Type-C male plug;

the first USB Type-C communication interface is a male plug, and is disposed on an upper surface of the upper housing of the powering device, and the first USB Type-C communication interface is configured to insert into the USB Type-C female receptacle of the portable device when the powering device is fixed on a back side of the portable device;

the second USB Type-C communication interface is a female receptacle disposed on an end face of the housing of the powering device, and is configured to receive the USB Type-C male plug of the head-wearable display device; and the charging interface is a Micro USB interface and disposed on a side of the housing of the powering device.

6. The head-wearable displaying and powering system according to claim 2, wherein:

the powering device further comprises a switch control circuit;

the switch control circuit is configured to detect whether the second USB Type-C communication interface is connected to the head-wearable display device;

when the second USB Type-C communication interface is detected as having been connected to the head-wearable display device, the switch control circuit is configured to control a circuit between the first USB Type-C communication interface and the first charging management chip to turn off; and when the second USB Type-C communication interface is detected as not being connected to the head-wearable display device, the switch control circuit is configured to control the circuit between the first USB Type-C communication interface and the first charging management chip to turn on.

7. The head-wearable displaying and powering system according to claim 6, wherein the switch control circuit comprises a PMOS transistor, a triode, a pushbutton switch, a first resistor and a second resistor;

wherein a first terminal of the pushbutton switch is connected with a base of the triode and a power supply output of the first charging management chip via the first resistor, and a second terminal of the pushbutton switch is grounded;

wherein a collector of the triode is connected with a gate of the PMOS transistor, and an emitter of the triode is grounded;

wherein a source of the PMOS transistor is connected with a power supply output of the charging management chip, and a drain of the PMOS transistor is connected with the first USB Type-C communication interface;

wherein one terminal of the second resistor is connected with the source of the PMOS transistor and another terminal of the second resistor is connected with the gate of the PMOS transistor; and wherein when the second USB Type-C communication interface is connected to the head-wearable display device, the pushbutton switch is configured to be in an ON state, and when the second USB Type-C communication interface is not connected with the head-wearable display device, the pushbutton switch is configured to be in an OFF state.

8. The head-wearable displaying and powering system according to claim 7, wherein the switch control circuit further comprises a diode; and wherein a positive electrode of the diode is connected to the drain of the PMOS transistor, and a negative electrode of the diode is connected with the first USB Type-C communication interface.

9. The head-wearable displaying and powering system according to claim 1, wherein the head-wearable display device includes a power supply module; and wherein when the head-wearable display device is connected to the powering device via the second USB Type-C communication interface, the power supply module is configured to receive working power from the powering device and power modules of the head-wearable display device.

10. The head-wearable displaying and powering system according to claim 9, wherein the head-wearable display device includes a second charging management chip and a second built-in battery, the second charging management chip is connected with the second USB Type-C communication interface, the second built-in battery and the power supply module;

wherein when the head-wearable display device is connected with the powering device via the second USB Type-C communication interface, the second charging management chip is configured to receive power from the powering device to charge the second built-in battery; and     wherein when the head-wearable display device is not connected with the powering device via the second USB Type-C communication interface, the second charging management chip is configured to receive power from the second built-in battery to power the power supply module.

* * * * *